(12) United States Patent
D'Ausilio et al.

(10) Patent No.: US 7,461,818 B2
(45) Date of Patent: *Dec. 9, 2008

(54) IN ORBIT SPACE TRANSPORTATION AND RECOVERY SYSTEM

(75) Inventors: Robert F. D'Ausilio, Bountiful, UT (US); Roger X. Lenard, Edgewood, NM (US); James R. Stuart, Louisville, CO (US); Franklin H. Williams, Jr., Salt Lake City, UT (US)

(73) Assignee: Iostar Corporation, North Salt Lake, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/703,296

(22) Filed: Feb. 7, 2007

(65) Prior Publication Data

US 2007/0153962 A1    Jul. 5, 2007

Related U.S. Application Data

(60) Division of application No. 10/736,887, filed on Dec. 15, 2003, now Pat. No. 7,216,833, which is a continuation-in-part of application No. 10/298,138, filed on Nov. 15, 2002, now abandoned, which is a continuation-in-part of application No. 09/918,705, filed on Jul. 30, 2001, now abandoned.

(51) Int. Cl.
*B64G 1/40* (2006.01)
*B64G 1/54* (2006.01)

(52) U.S. Cl. ................... 244/171.1; 244/171.7

(58) Field of Classification Search .............. 244/171.1, 244/171.7, 172.2, 172.3, 172.4, 172.5
See application file for complete search history.

(56) References Cited

U.S. PATENT DOCUMENTS 3,465,986 A * 9/1969 Milly ...................... 244/172.4

(Continued)

OTHER PUBLICATIONS

Martin, A. R., "Nuclear Electric Propulsion of Spacecraft," Journal of the British Interplanetary Society, Dec. 1995, vol. 48, No. 12, pp. 517-524.*

(Continued)

*Primary Examiner*—Rob Swiatek
(74) *Attorney, Agent, or Firm*—Brinks Hofer Gilson & Lione; Steven P. Shurtz

(57) ABSTRACT

A preferred In Orbit Transportation & Recovery System (IOSTAR™)(10) includes a space tug powered by a nuclear reactor (19). The IOSTAR™ includes a collapsible boom (11) connected at one end to a propellant tank (13) which stores fuel for an electric propulsion system (12). This end of the boom (11) is equipped with docking hardware (14) that is able to grasp and hold a satellite (15) and as a means to refill the tank (13). Radiator panels (16) mounted on the boom (11) dissipate heat from the reactor (19). A radiation shield (20) is situated next to the reactor (19) to protect the satellite payload (15) at the far end of the boom (11). The IOSTAR™ (10) will be capable of accomplishing rendezvous and docking maneuvers which will enable it to move fully deployed spacecraft between a low Earth parking orbit and positions in higher orbits or to other locations in our Solar System.

10 Claims, 16 Drawing Sheets

U.S. PATENT DOCUMENTS

| | | | | |
|---|---|---|---|---|
| 5,734,736 A | * | 3/1998 | Palmer et al. | 382/103 |
| 5,806,802 A | * | 9/1998 | Scott | 244/172.4 |
| 5,883,394 A | * | 3/1999 | Mussman | 250/515.1 |
| 6,254,035 B1 | * | 7/2001 | Howard et al. | 244/172.4 |
| 7,070,151 B2 | * | 7/2006 | D'Ausilio et al. | 244/171.1 |

OTHER PUBLICATIONS

Jet Propulsion Laboratory, "SP-100 Technical Summary Report: vol. I—Executive Summary," Sep. 1994.*

* cited by examiner

Service Vehicle

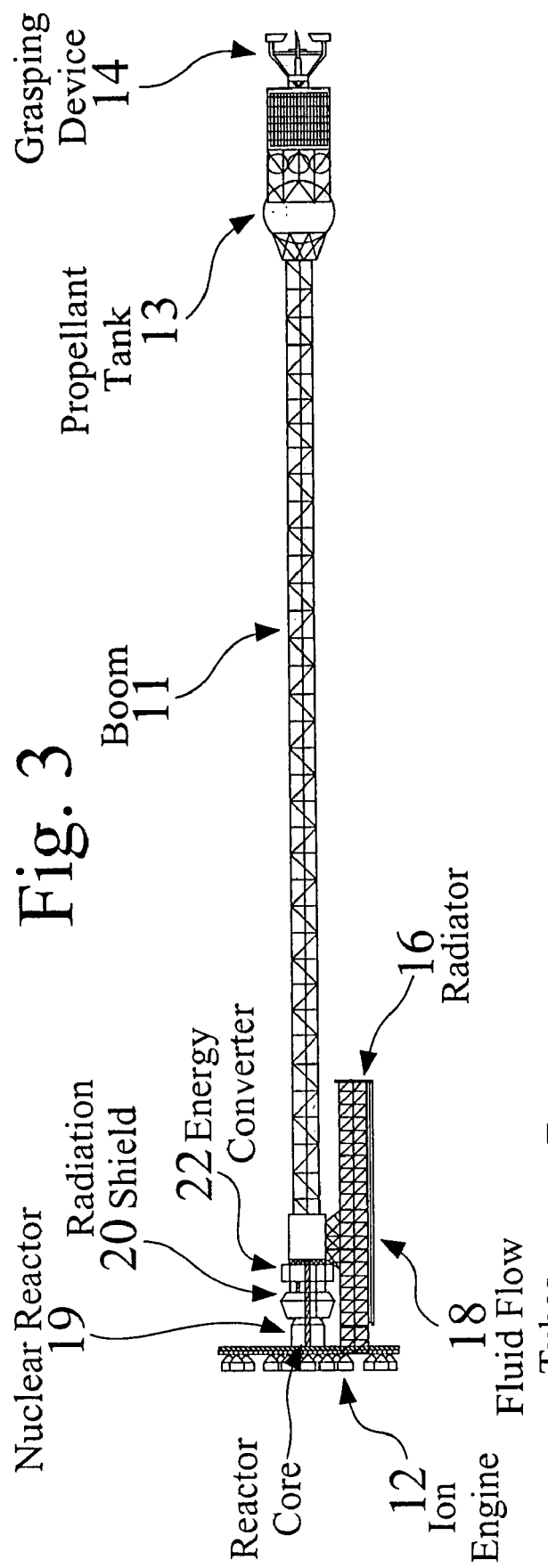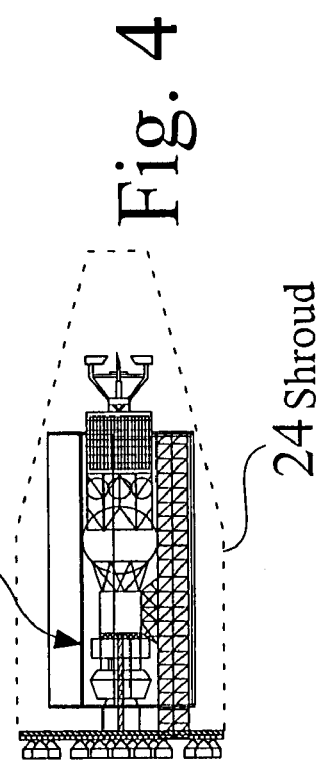

Overview of Brayton System

Current National Space Architecture
Satellite launched to GSO: 7-10 hours to orbit IOSTAR Space Architecture
45-65 days to orbit In-orbit repair Space Station Services In-orbit Placement Recovery / Retrival

IN ORBIT SPACE TRANSPORTATION AND RECOVERY SYSTEM

CROSS-REFERENCE TO RELATED PENDING PATENT APPLICATIONS & CLAIMS FOR PRIORITY

The present application is a divisional of Ser. No. 10/736,887, filed Dec. 15, 2003, issued as U.S. Pat. No. 7,216,833, which is a continuation-in-part of Ser. No. 10/298,138, filed Nov. 15, 2002, now abandoned, which is a continuation-in-part of Ser. No. 09/918,705, filed Jul. 30, 2001, now abandoned.

The present application also claims the benefit of International Patent Application No. PCT/US03/32748, filed Nov. 10, 2003, pursuant to 35 U.S.C. Section 363.

FIELD OF THE INVENTION

The present invention relates to the field of spacecraft and satellites. More particularly, this invention provides a transportation and rescue system for moving objects in space between low Earth orbits, higher orbits and beyond.

FEDERALLY SPONSORED RESEARCH OR DEVELOPMENT

None.

BACKGROUND OF THE INVENTION

Hundreds of man-made satellites are currently in orbit around the Earth. Over the next decade, governments and companies around the globe plan to launch hundreds of new spacecraft for a variety of communications, defense and remote sensing projects. The placement of satellites into Earth orbit can cost many millions of dollars. A conventional launch involves a large multi-stage, single-use rocket to lift a satellite into a geosynchronous orbit.

A general description of conventional nuclear-propulsion systems may be found in a text entitled A Critical Review of Space Nuclear Power and Propulsion, edited by Mohamed S. El-Genk, which was published by the American Institute of Physics in 1994.

The U.S. Departments of Energy and Defense and NASA developed plans for a Generic Flight System for space-based defense systems and NASA exploration missions called SP-100 in the mid-1980's. The SP-100 was designed to supply nuclear-power for military and civilian space systems. This early system was designed as a single-use power stage for a single, permanently attached payload; and was never configured for any on-orbit rendezvous, docking or servicing missions. The SP-100 is described in the SP-100 Technical Summary Report, which was prepared for the U.S. Department of Energy by the Jet Propulsion Laboratory and the California Institute of Technology in September, 1994.

Various nuclear electric propulsion systems are described in a publication entitled Nuclear Electric Propulsion, A Summary of Concepts Submitted to the NASA/DoE/DoD Nuclear Electric Propulsion Workshop, which was held in Pasadena, Calif. on 19-22 Jun. 1990.

The Aerospace Division of the Olin Corporation proposed a small engine for the small satellite community called the Small Upper Stage (SUS). The SUS was designed to accomplish low Earth orbit transfers, orbit circularizations and plane changes using hydrazine propulsion.

TRW has patented several methods and apparatus intended for the space transportation market. In U.S. Pat. No. 4,471,926, Steel describes a Transfer Vehicle for Use in Conjunction with a Reusable Space Shuttle. This spacecraft has a propulsion system that uses a low-thrust bi-propellant liquid rocket engine to provide a soft, low-acceleration ascent. In U.S. Pat. No. 4,575,029, Harwood and Love disclose a spacecraft for transporting a payload from a space shuttle in a low altitude parking orbit to an operational orbit. In U.S. Pat. No. 4,943,014, Harwood and Love reveal their "soft ride" method for changing the altitude or position of a spacecraft in orbit using a liquid bi-propellant engine.

In U.S. Pat. No. 4,664,344, Harwell describes an apparatus and method of capturing an orbiting spacecraft. This device comprises a relatively small mechanical probe and fixture operated by an astronaut during a spacewalk.

In an article entitled Topaz Two Proves to Be a Gem for International Tech Transfer, contained in Technical Applications Report from Ballistic Missile Defense Organization, 1995, thermoionic reactors for space-based power generation are disclosed.

Prospects for Nuclear Electric Propulsion Using Closed-Cycle Magnetohydrodynamic Energy Conversion, by R. Litchford et al. was presented at the 12th Annual Advanced Space Propulsion Workshop in Huntsville, Ala. on 3-5 Apr. 2001.

J. Collins et al. disclose a Small Orbit Transfer Vehicle for On-Orbit Servicing and Resupply which was presented at the 15th Annual Utah State University Conference on Small Satellites at Logan, Utah, 13-16 Aug. 2001.

In U.S. Pat. No. 4,754,601, Minovitch discloses "a propulsion system for reusable space-based vehicles is presented wherein the propulsive working fluid is atmospheric gas."

In U.S. Pat. No. 5,260,639, De Young et al. describe "a method of supplying power to a device such as a lunar rover located on a planetary surface."

In U.S. Pat. No. 6,213,700, Koppel discloses a "method [which] serves to place a space vehicle, such as a satellite, on a target orbit such as the orbit adapted to normal operation of the space vehicle and starting from an elliptical initial orbit that is significantly different from, and in particular more eccentric than the target orbit."

In U.S. Pat. No. 6,357,700, Provitola describes "an spacecraft/airship, which uses buoyancy and thrusters to ascend into space with lifting gas as propellant or fuel for thrusters, which may be conventional thrusters or electric turbojets or ion thrusters."

In U.S. Pat. No. 5,260,639, Basuthakur et al reveal "a satellite assembly [that] is formed from any number of bus modules which have a substantially common shape and interior space volume."

In U.S. Pat. No. 6,478,257, Oh et al. describe "systems and methods that employ a phase change material to provide thermal control of electric propulsion devices."

In U.S. Pat. No. 3,825,211, Minovitch presents a "space vehicle [which] carries a vaporizable propellant . . . [E]nergy is transmitted to the vehicle while in space by a laser beam originating on the ground or some other body or satellite."

The development of an in-orbit space transportation and rescue vehicle would dramatically reduce the cost of changing the orbital position of a satellite. Such a system would revolutionize the military and commercial space industries, and fill a long-felt need in the telecommunications, direct-broadcast and remote-sensing industries.

SUMMARY OF THE INVENTION

The In Orbit Space Transportation & Recovery System (IOSTAR™) will revolutionize the commercial space industry by providing a lower cost alternative to conventional methods of moving spacecraft in orbit. Instead of using a multi-stage rocket powered by expensive and dangerous chemical fuels to lift a payload to a geosynchronous or geostationary orbit, the IOSTAR™ will rendezvous with a satellite waiting in a low Earth orbit, dock with the satellite and then gently transport it to an altitude of 22,300 miles using reliable nuclear-powered electric propulsion. The IOSTAR™ will also be available to relocate, rescue and/or retrieve satellites in need of repositioning or repair, and will be capable of ferrying objects to the Moon and to the neighboring planets of our Solar System.

One embodiment of the IOSTAR™ includes a collapsible boom which may double as a radiating surface, and which expands to its fully extended position after reaching orbit. The boom is connected at one end to a tank which stores xenon which fuels ion propulsion engines located at the opposite end of the boom. Docking hardware which is capable of engaging a wide variety of objects in space is coupled to the farthest end of the boom near the fuel tank. A nuclear reactor, a radiation shield, an energy converter and a large array of heat-dissipating flat-panel radiators are mounted on the boom between the reactor and a payload grasping device.

An appreciation of the other aims and objectives of the present invention and a more complete and comprehensive understanding of this invention may be obtained by studying the following description of a preferred embodiment and by referring to the accompanying drawings.

A BRIEF DESCRIPTION OF THE DRAWINGS

FIGS. 1A & 1B present top and end views of one of the preferred embodiments of the In Orbit Space Transportation & Recovery System (IOSTAR™) vehicle in its fully deployed, orbital configuration.

FIG. 3 is a side view of the present invention in its fully deployed configuration.

FIG. 4 reveals the present invention in a folded and collapsed configuration that may be loaded aboard a launch vehicle.

FIGS. 5, 6, 7 and 8 present side and end views of preferred embodiments of the present invention stowed aboard a launch vehicle.

Figure 9:
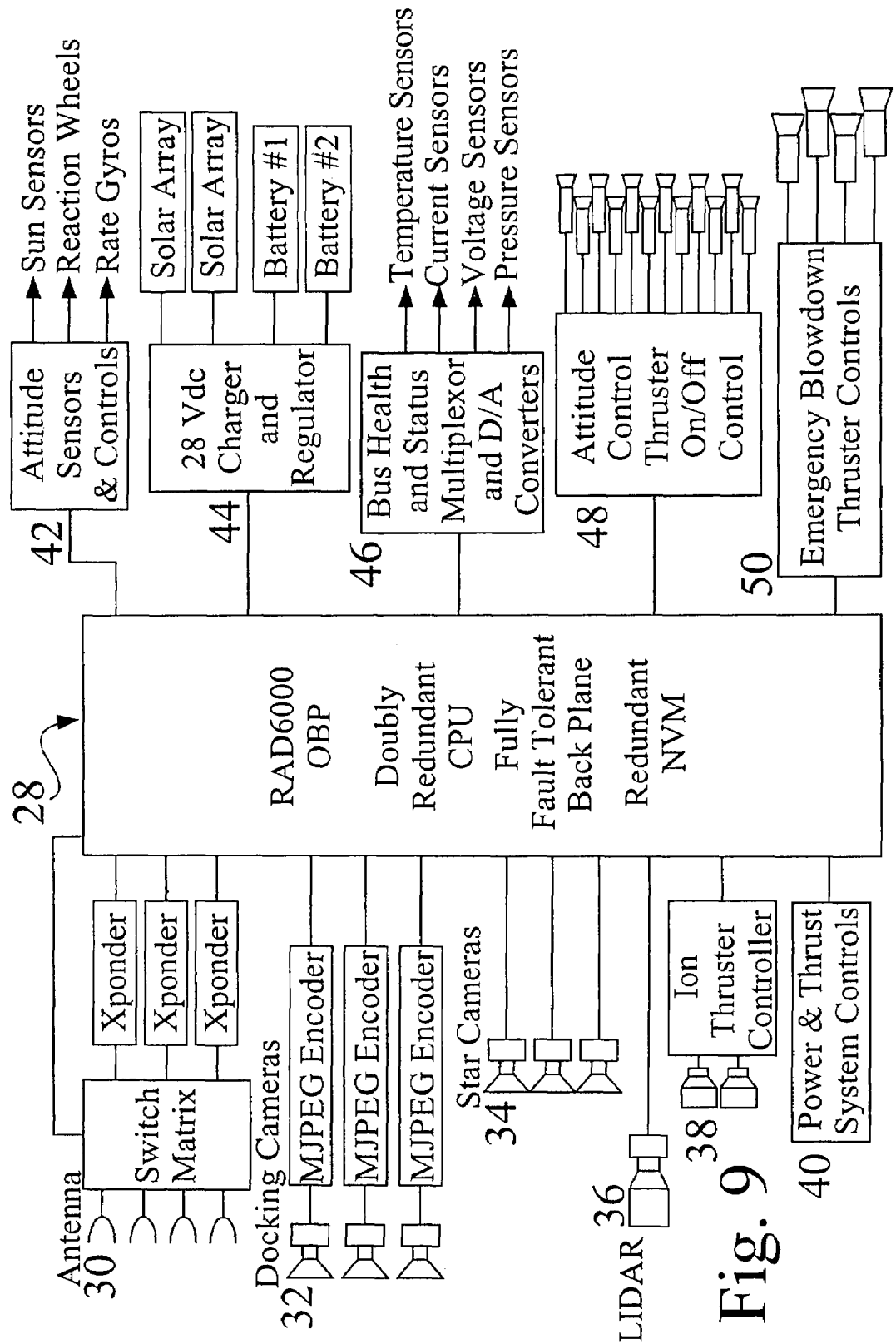

FIG. 9 is a block diagram of control systems installed in the IOSTAR™ spacecraft.

Figure 10:
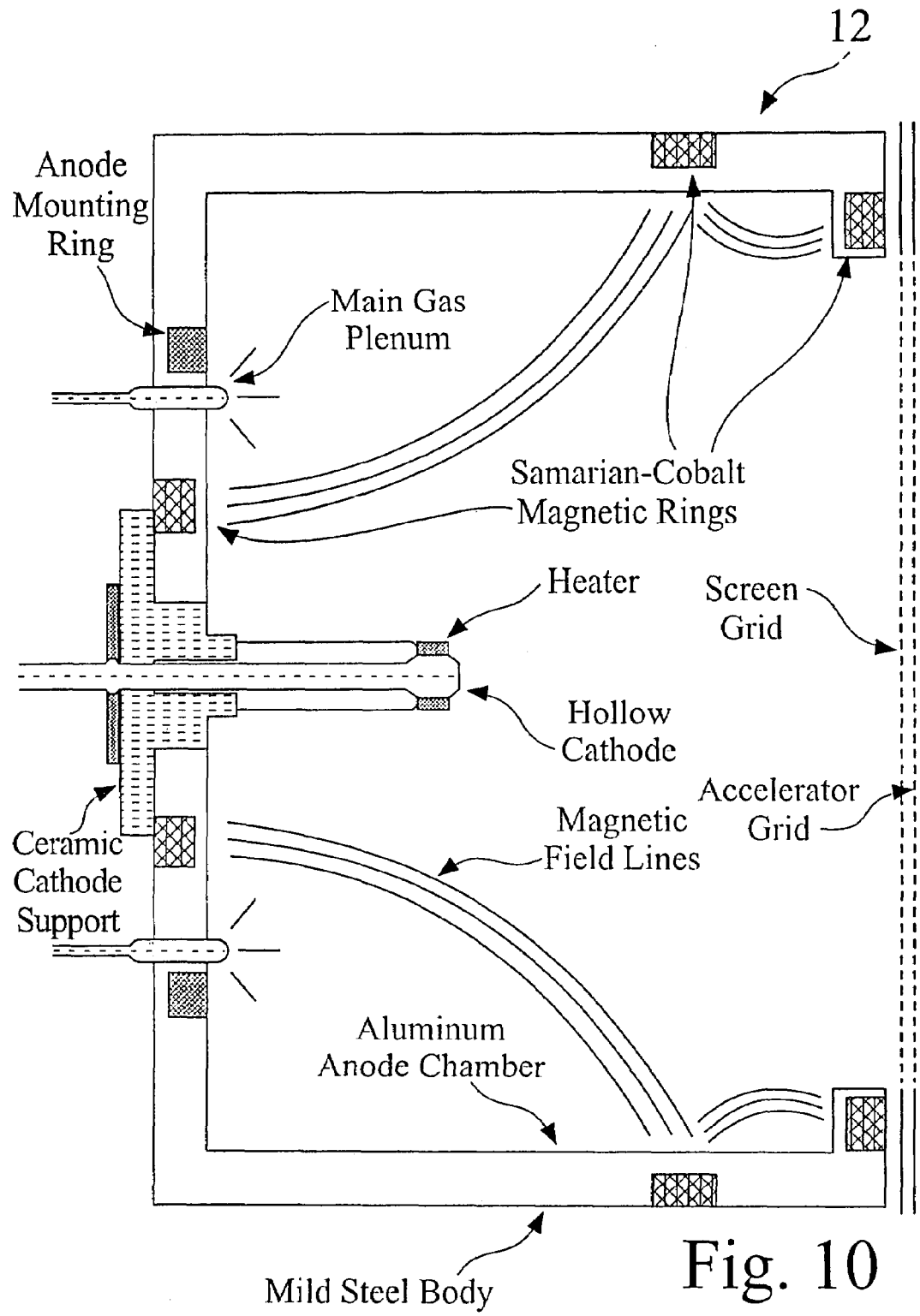

FIG. 10 is a cross-sectional view of an ion propulsion engine utilized by one embodiment of the IOSTAR™ spacecraft.

Figure 11:
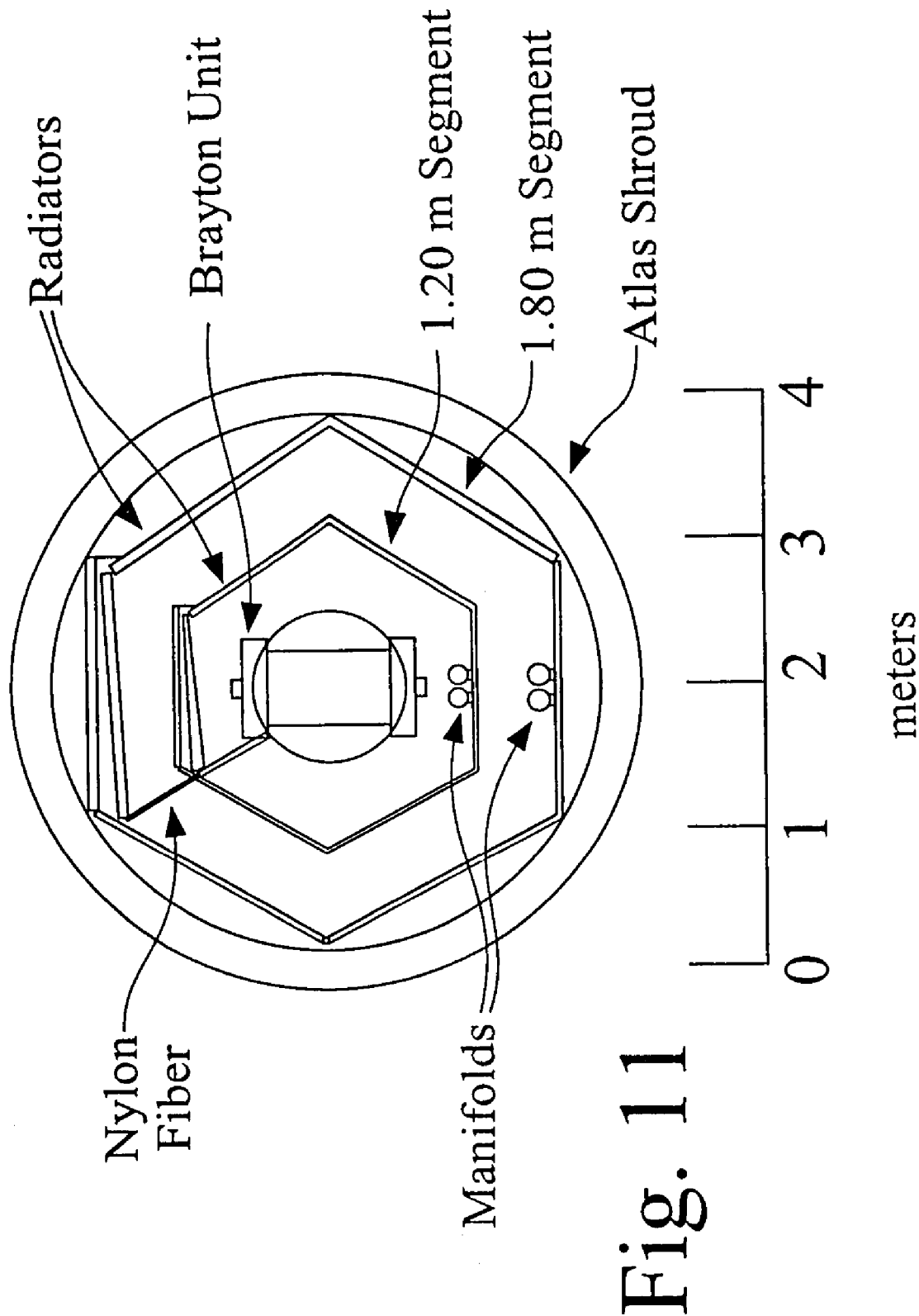

FIG. 11 is a cross-sectional view of a portion of one embodiment of the invention inside a launch vehicle shroud.

Figure 12:
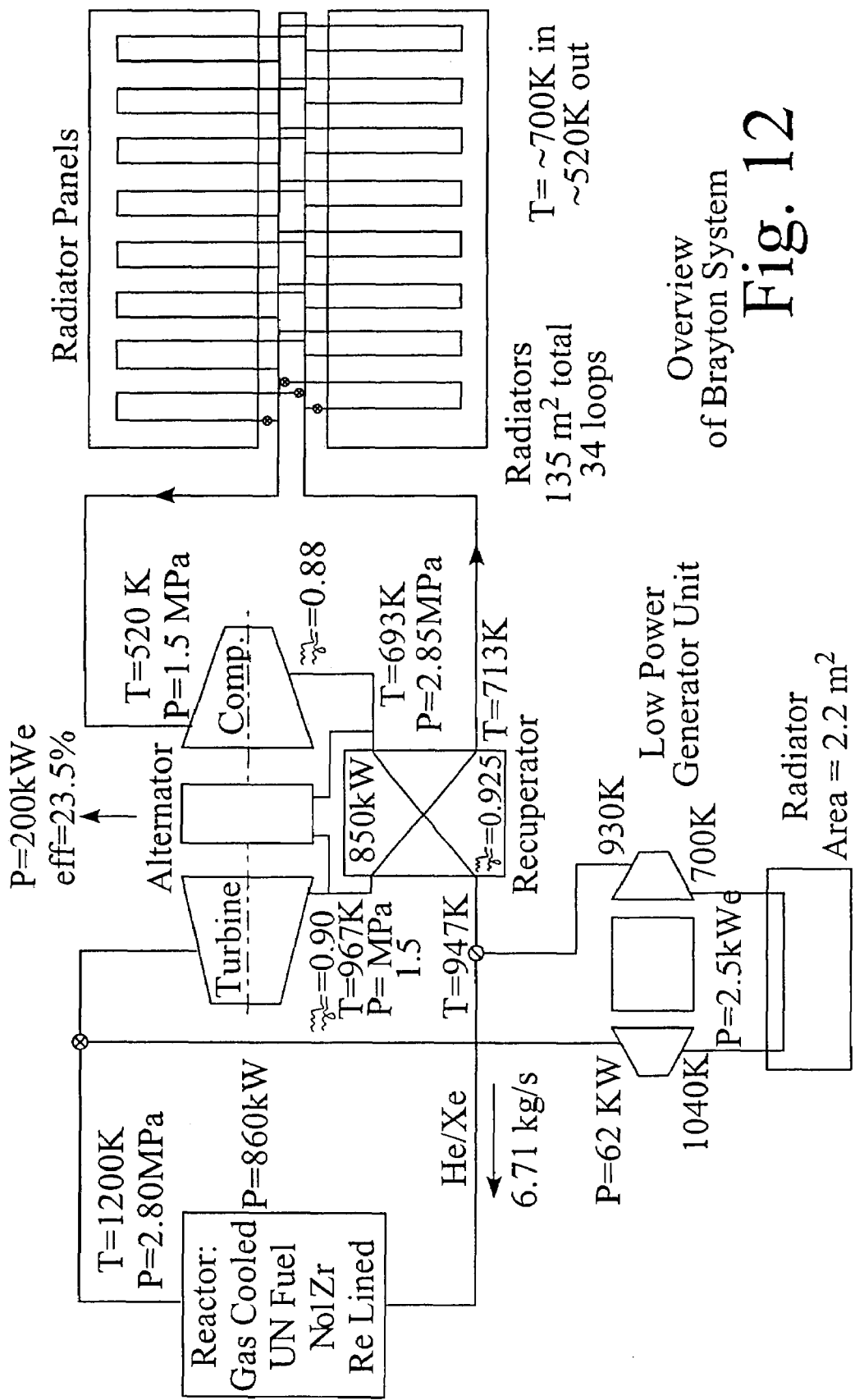

FIG. 12 presents a diagram which provides an overview of the Brayton System, which is used as the energy converter in one embodiment of the invention.

Figure 13:
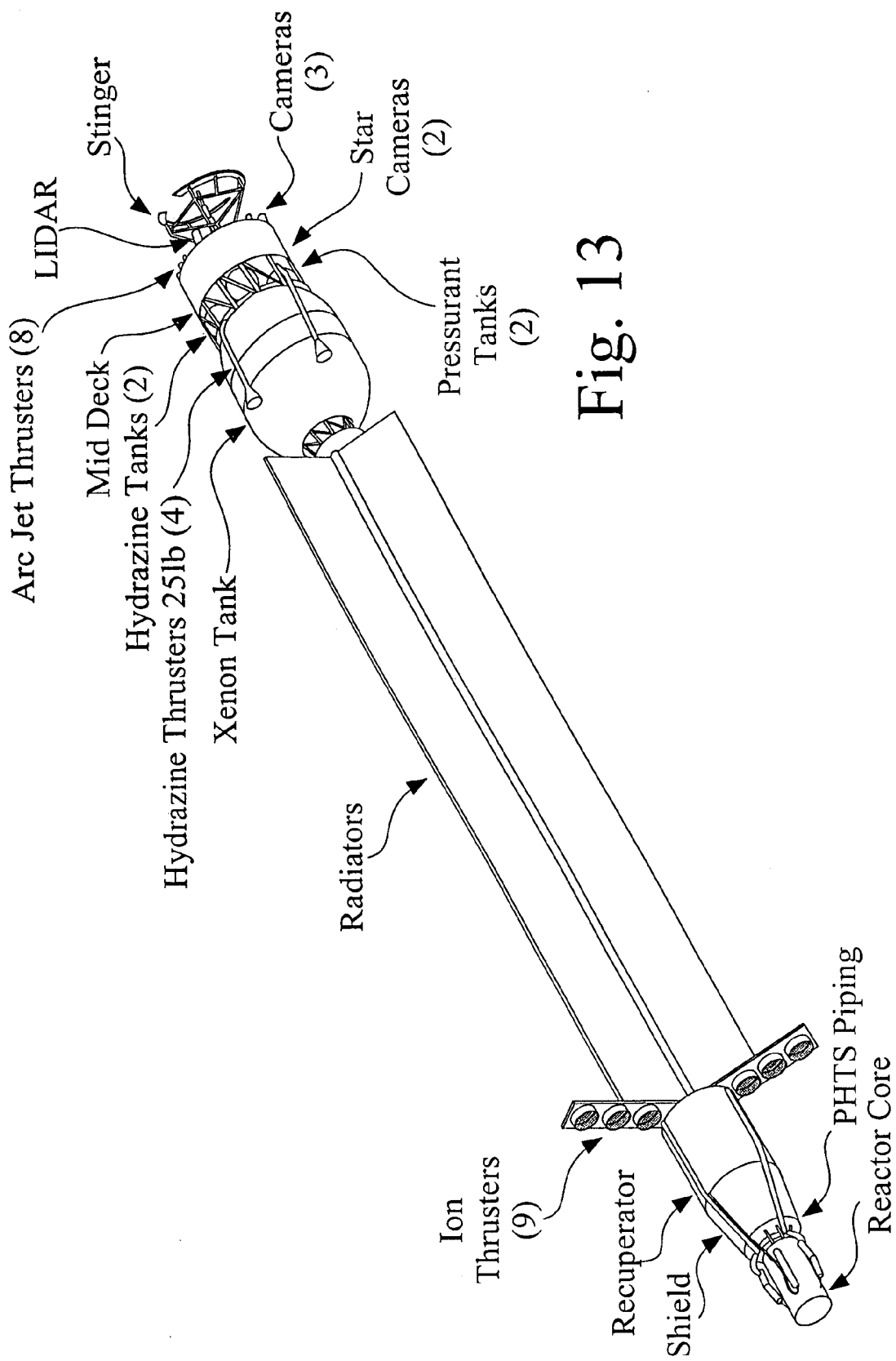

FIG. 13 supplies a perspective view of an alternative embodiment of the IOSTAR™.

Figure 14:
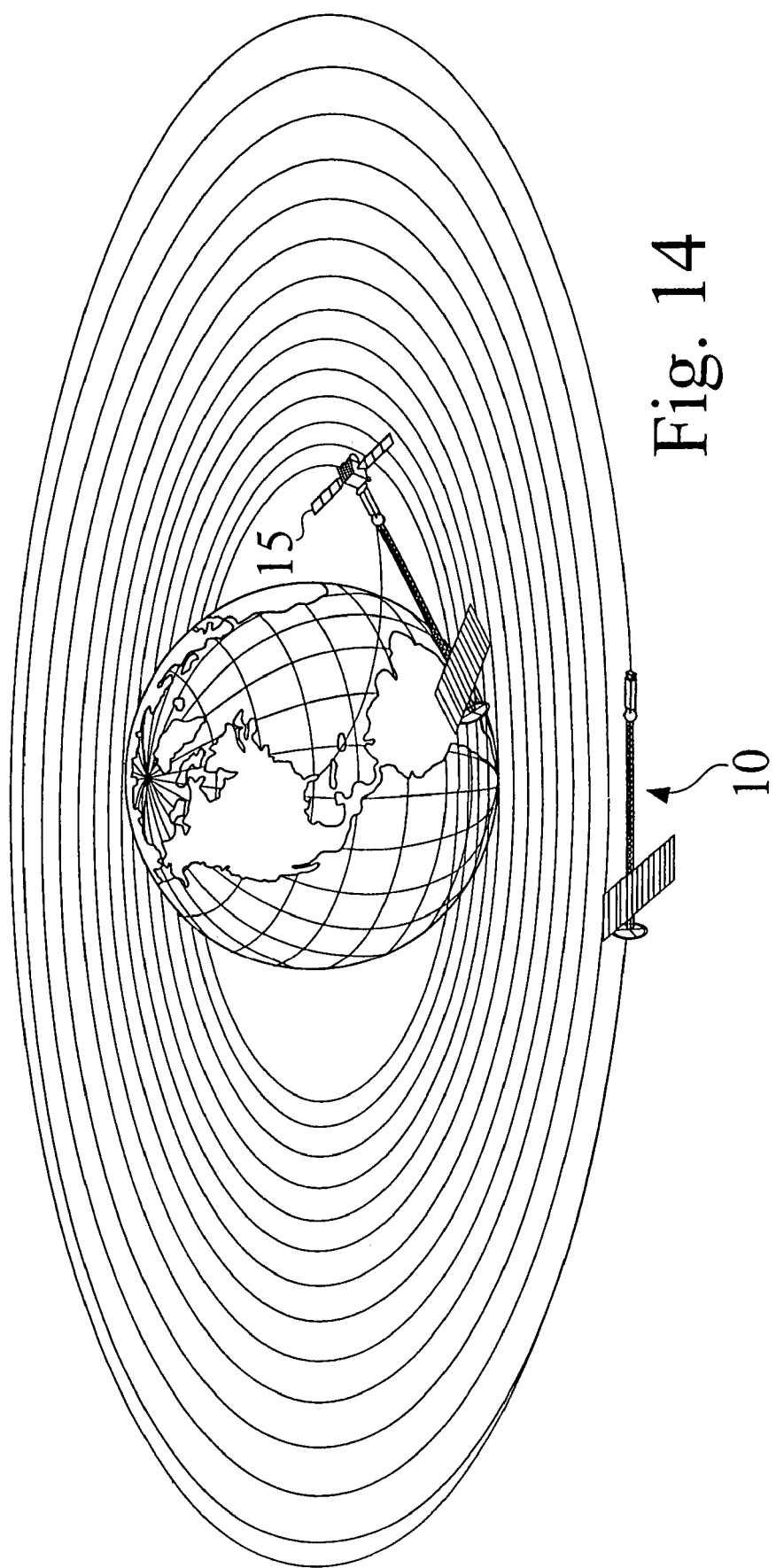

FIG. 14 is a schematic depiction of the process of conveying a satellite from a low Earth orbit to a higher orbit using the present invention.

Figure 15:
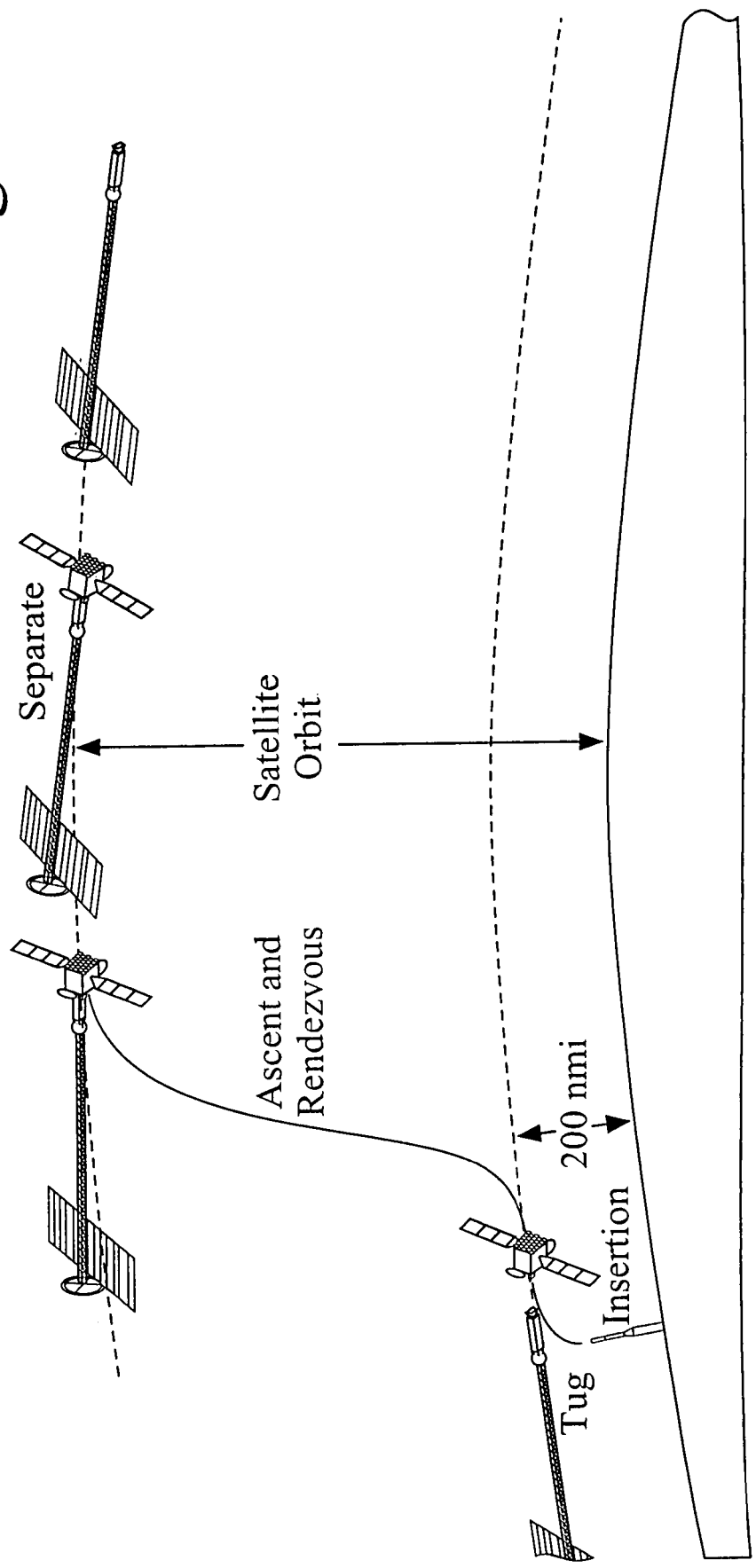

FIG. 15 illustrates a method for repositioning a satellite.

Figure 16:
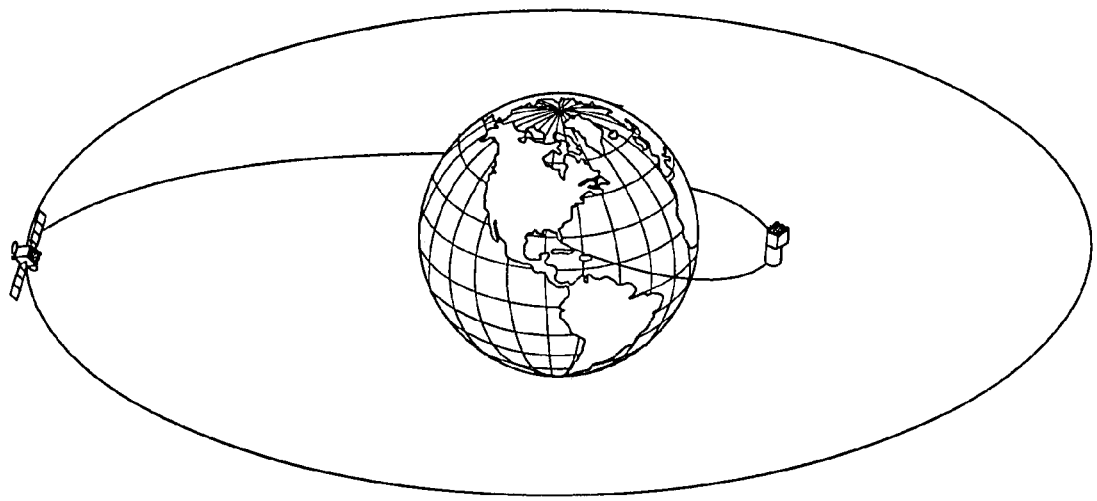
Figure 17:
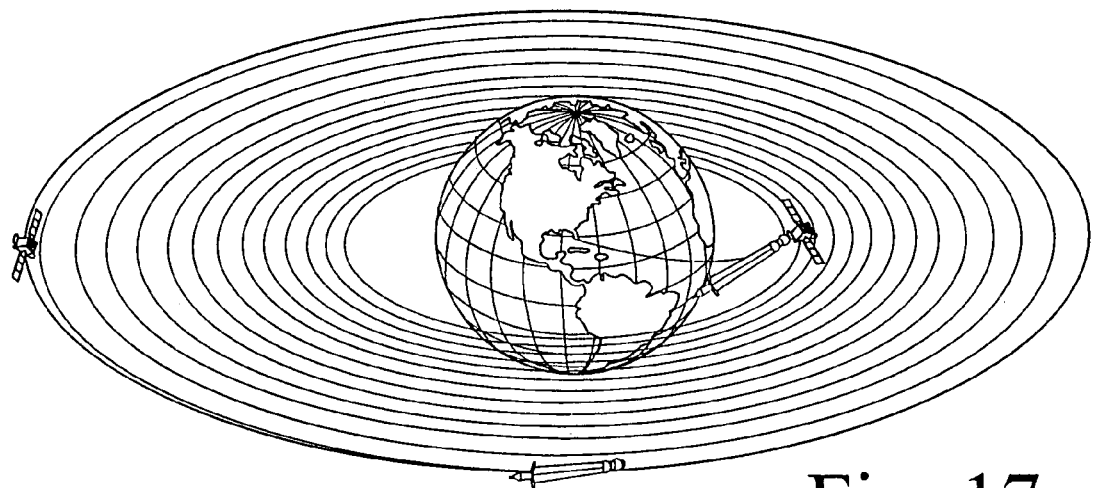
Figure 19:
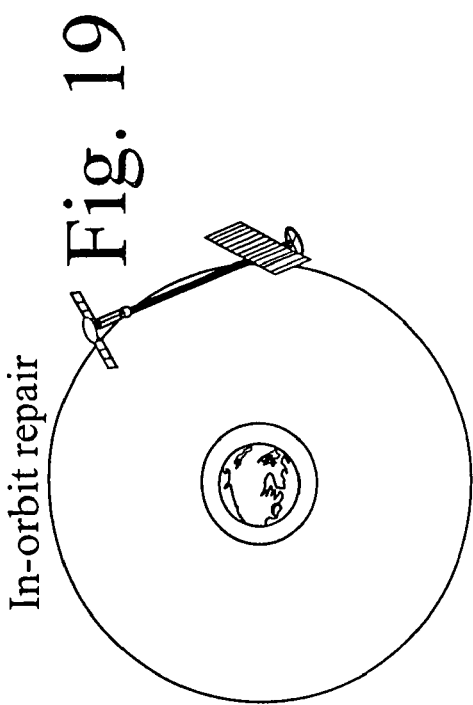
Figure 21:
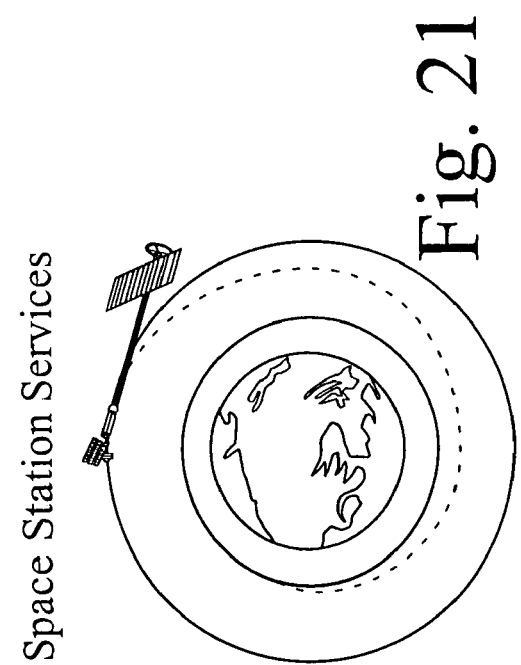
Figure 18:
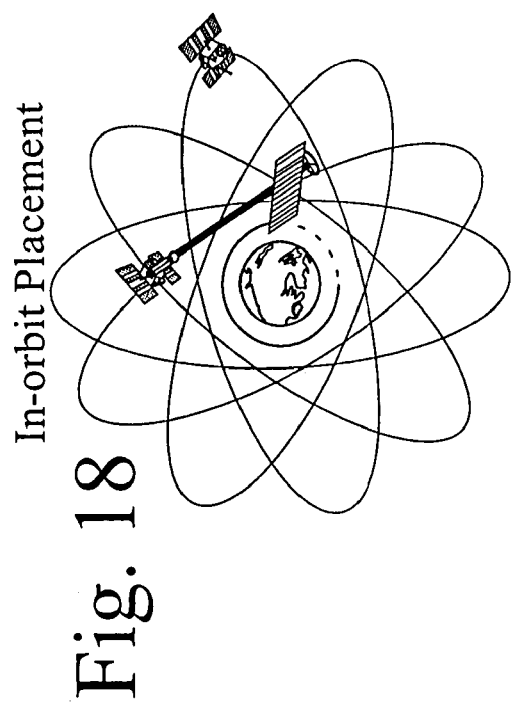
Figure 20:
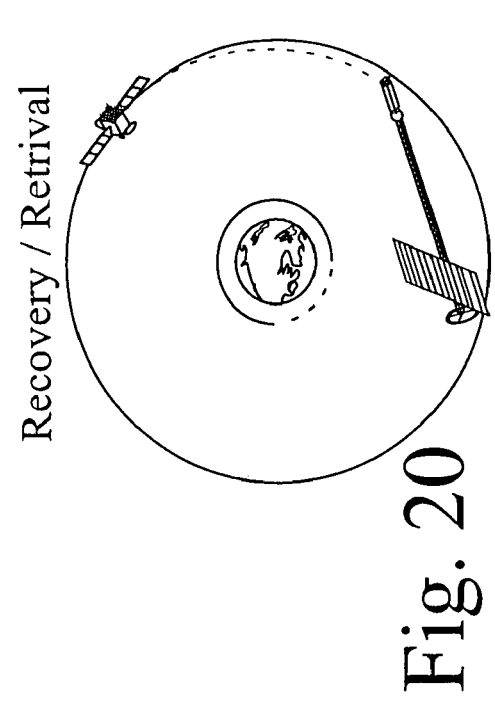

FIGS. 16 and 17 are comparisons of high orbit architectures for conventional and IOSTAR™ missions.

FIGS. 18, 19, 20 and 21 exhibit four IOSTAR™ missions.

Figure 22:
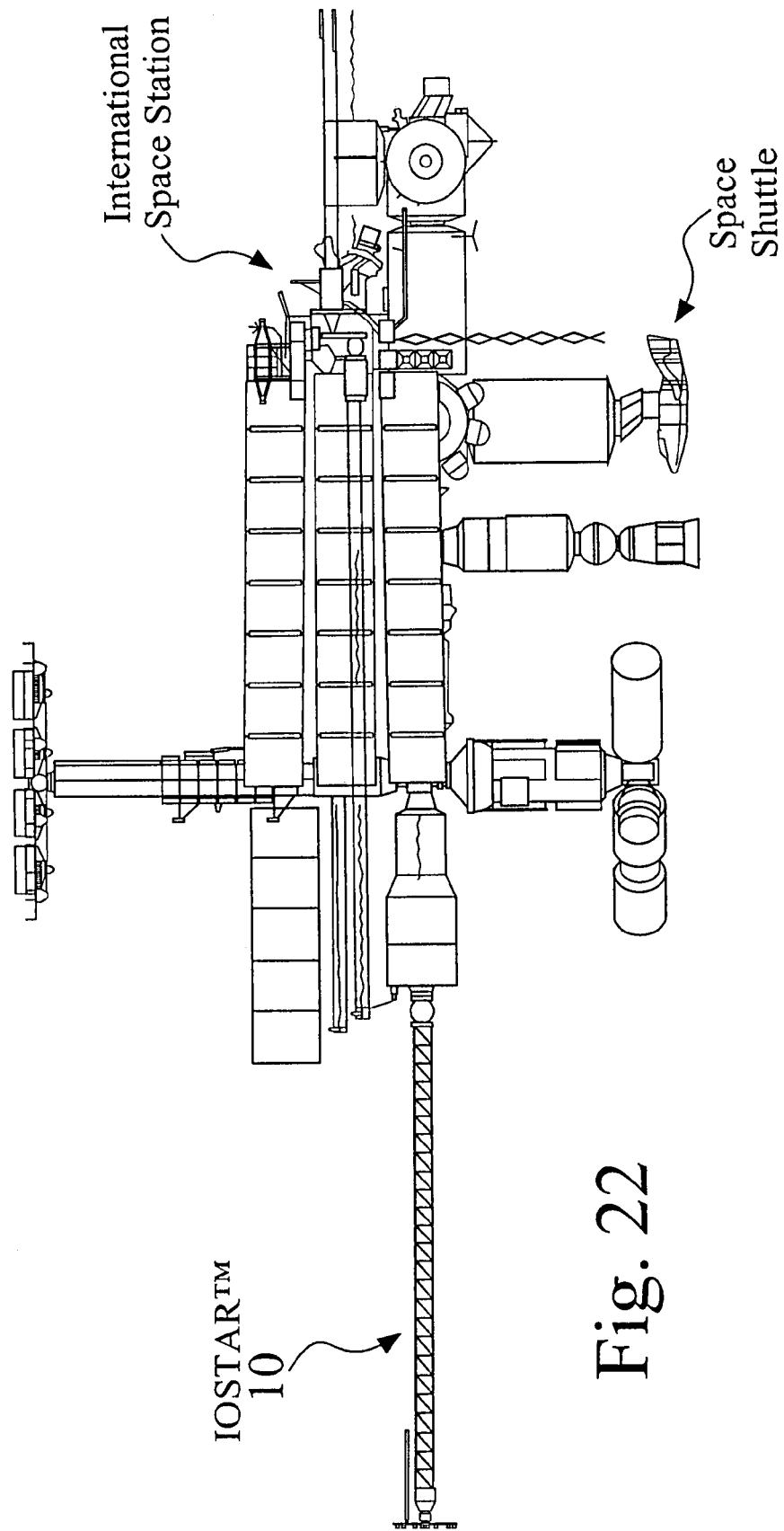
Figure 23:
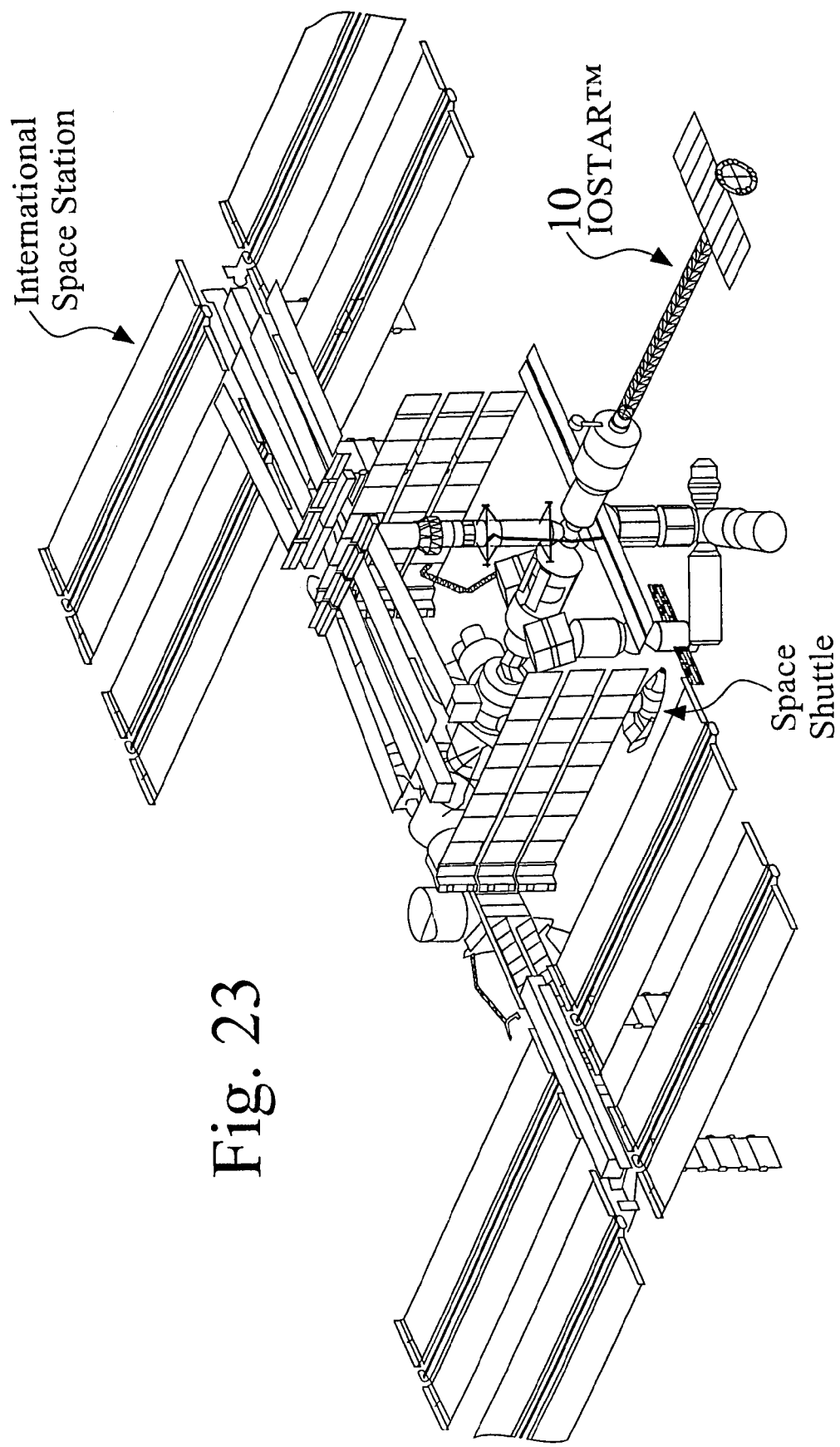

FIGS. 22 and 23 show the IOSTAR™ and the International Space Station.

Figure 24:
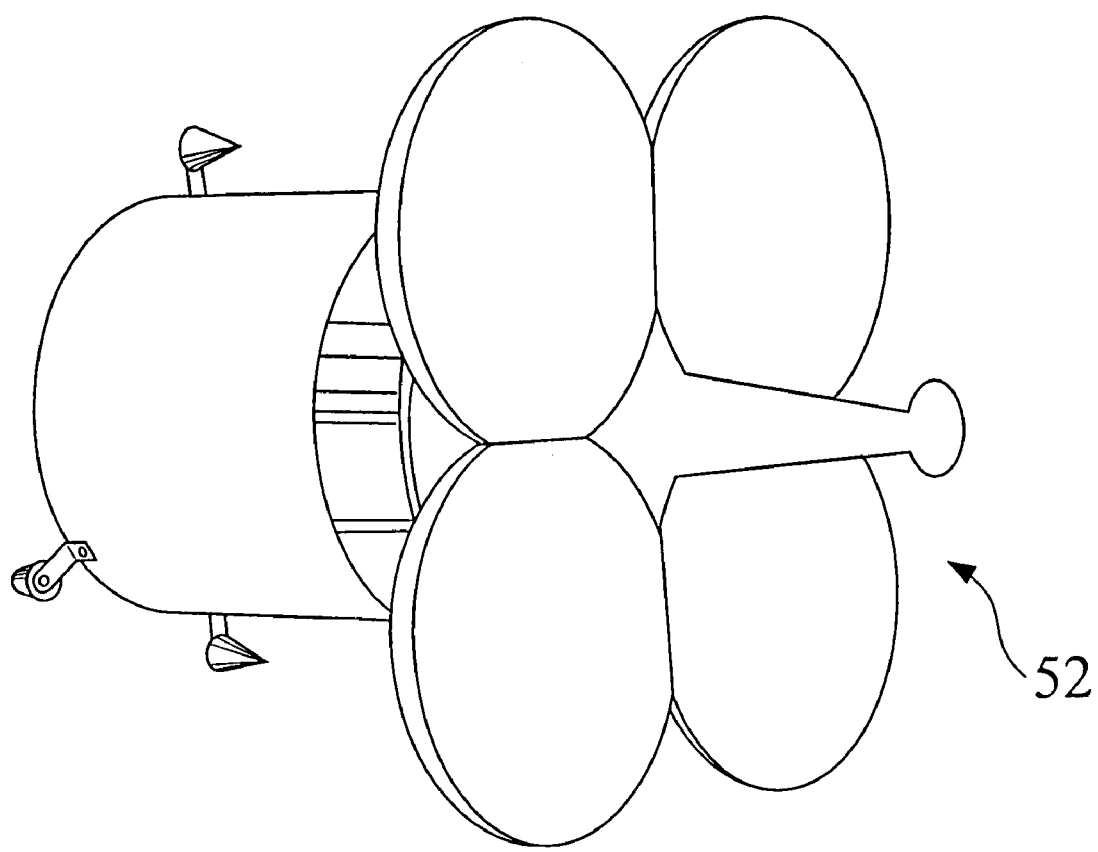

FIG. 24 depicts a satellite having an array of antennas that could be combined with the IOSTAR to provide direct broadcast services.

A DETAILED DESCRIPTION OF PREFERRED & ALTERNATIVE EMBODIMENTS

I. Overview of Embodiments of IOSTAR™

Figure 1:
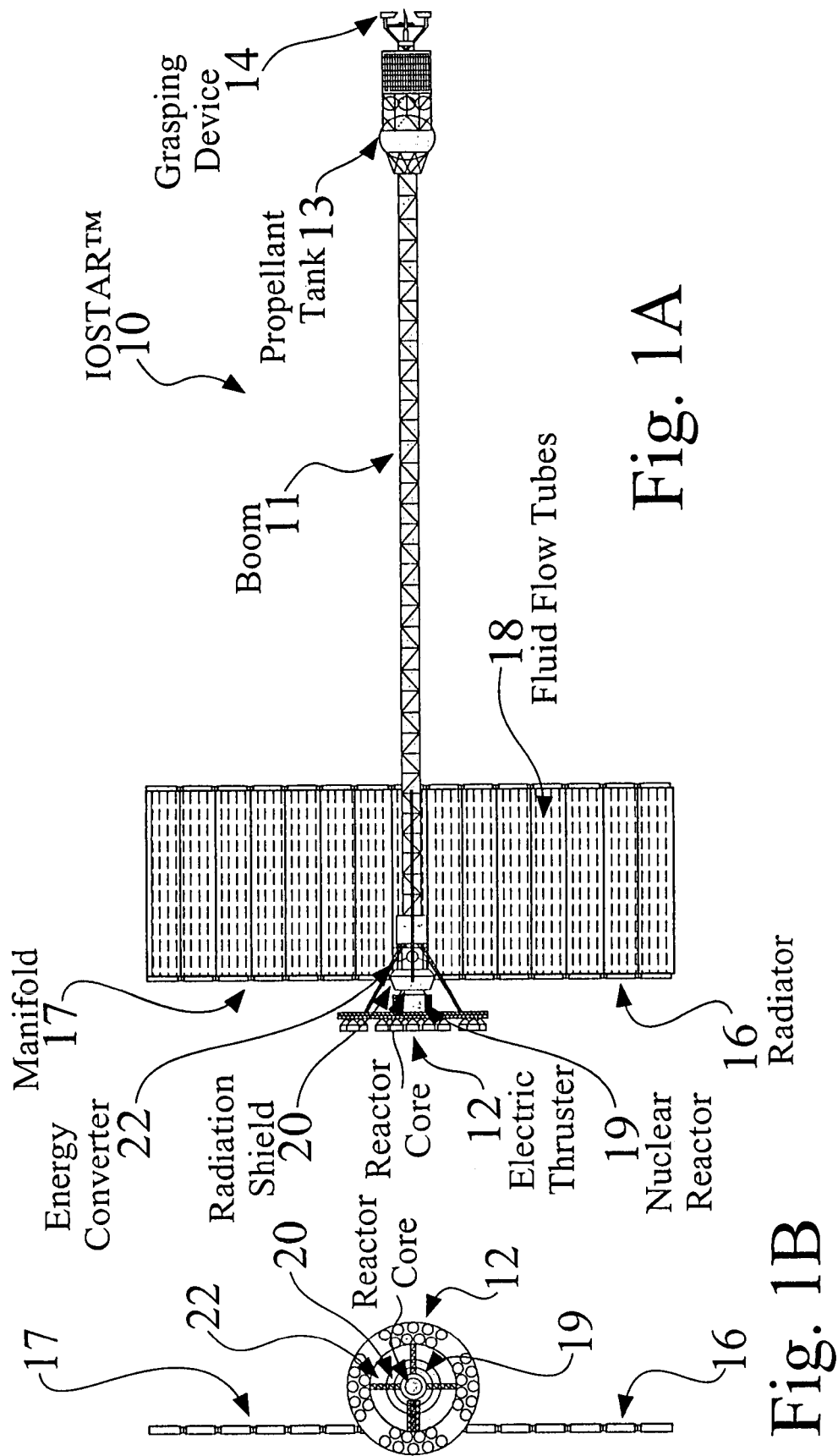

FIGS. 1A and 1B reveal side and end views of one of the preferred embodiments of the In Orbit Transportation & Recovery System, or IOSTAR™ 10. IOSTAR™ is a Trade and Service Mark owned by the Assignee. IOSTAR™ is a reusable spacecraft 10 which is designed primarily for orbital transportation and rescue services.

In this. Specification and in the Claims that follow, the term "satellite" refers to any object in any orbit around anybody, whether natural or man-made. A "celestial body" is any planet, moon, asteroid, comet, star or any other aggregation of matter. The term "spacecraft" concerns any man-made device or means used at high altitude, below orbital altitude, in orbit, or beyond the Earth's atmosphere, or for travel in space; including a ship, structure, machine or manufacture that may travel beyond Earth's orbit. The term "orbit" generally means a pathway or line of movement of an object that includes any position at any point or altitude above the surface of the Earth or other celestial body which allows an object, satellite or spacecraft to move above the Earth's surface with or without aerodynamic lift, up to a distance which is still within the Earth's gravitational field. Orbits may include pathways around the Earth, the Moon, the Sun or any other celestial body.

In general, the term "low Earth orbit" encompasses any orbital altitude below geosynchronous or geostationary orbit. In general, the term "high Earth orbit" encompasses any orbital altitude from geosynchronous or geostationary orbit to any position above geosynchronous or geostationary orbit within the Earth's gravitational field. In general, the term "space" refers to any position generally outside the Earth's atmosphere. The term "object" pertains to any configuration, embodiment or manifestation physical mass or matter, including natural objects such as asteroids or MMOD's (micro-meteoroids and orbital debris), man-made devices, or other things or items. The term "payload" encompasses; any item or cargo that is carried or transported. A typical payload is a satellite, but a payload could be a load of material, supplies, equipment, or some other object.

In one embodiment of the invention, the backbone or central skeleton of the IOSTAR™ 10 comprises a lightweight but strong, generally metallic or composite, collapsible, compressible or at least partially foldable boom 11. The boom 11 provides structural support, but is also capable of fitting inside a launch vehicle when collapsed, and then extending to its fully deployed length after launch. The launch vehicle may be a single use vehicle, or may be reusable or expendable. In a preferred embodiment of the invention, the IOSTAR™ will be lifted into orbit by the United States Space Shuttle.

In one embodiment, one end of the boom 11 is connected to an electric propulsion system 12. In general, an electric propulsion system is any means which employs electromagnetic forces to generate thrust. In one embodiment, a tank 13 which stores propellant for the electric propulsion system 12 is connected to the boom 11 at the end opposite from the ion engines 12. In a preferred embodiment of the invention, the electric propulsion system is an ion propulsion system 12 which expels ions to produce thrust. Table One contains a list of some of the various types of electric propulsion systems that may be utilized to implement the present invention.

TABLE ONE

Electric Propulsion Alternatives.

Electrothermal
    Arcjets
    Resistojets
    Electrothermal thruster
    Continuous wave
    Laser & Laser Ablative
    Microwave heated thruster
Electromagnetic
    Magnetoplasmadynamic thruster
        Self-Field
        Applied Field
    Hall effect thruster
    Stationary plasma thruster
    θ-pinch thruster
    Compact toroid thruster
    Pulsed-inductive thruster
    Coil-gun
    Z-pinch discharge thruster
    Coax gun
    Pulsed-plasma thruster
    Rail-gun
    Mass-driverElectrostatic
    Ion engine
    Field emission
Other
    Magnetic loop sail
    Electrodynamic Tether The recitation of electric propulsion alternatives in Table One is not intended to exclude any unlisted or equivalent alternatives.

In a preferred embodiment of the invention, the ion engines 12 employ xenon ions, so the tank is filled with xenon. In an alternative embodiment, the ion propulsion system 12 includes a Hall thruster. Other embodiments of the invention may employ different fuels, and may utilize multiple fuels. The invention may utilize any tank means which holds, envelopes or stores suitable propellants.

Figure 2:
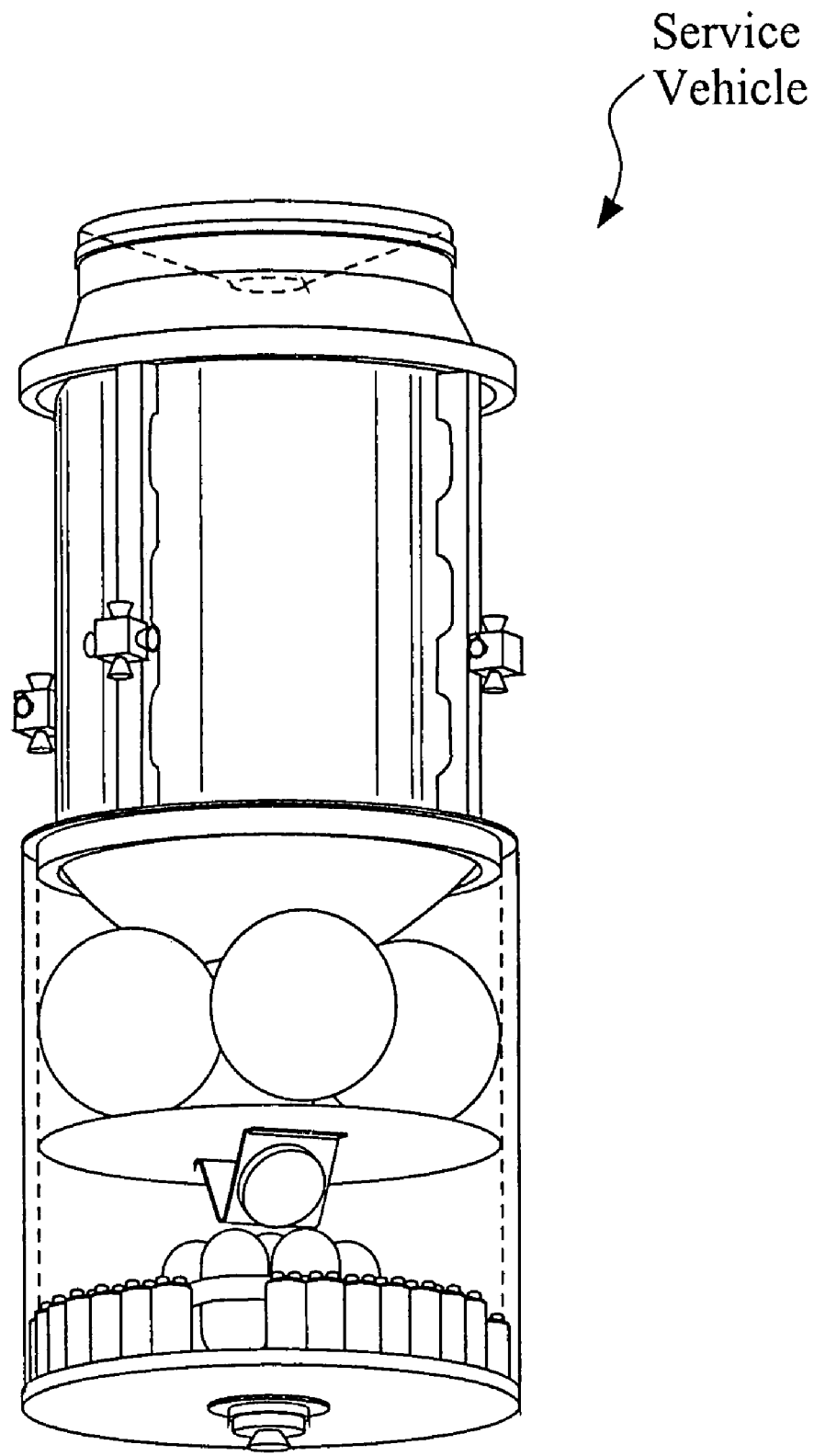
FIG. 2 depicts a separate service and refueling vehicle.
Figure 6:
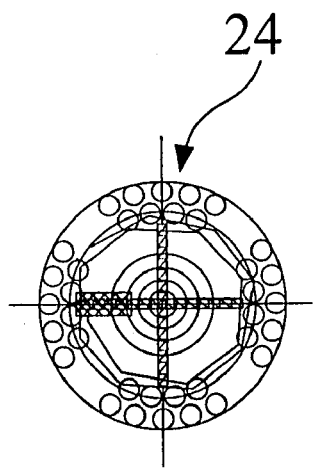
Figure 5:
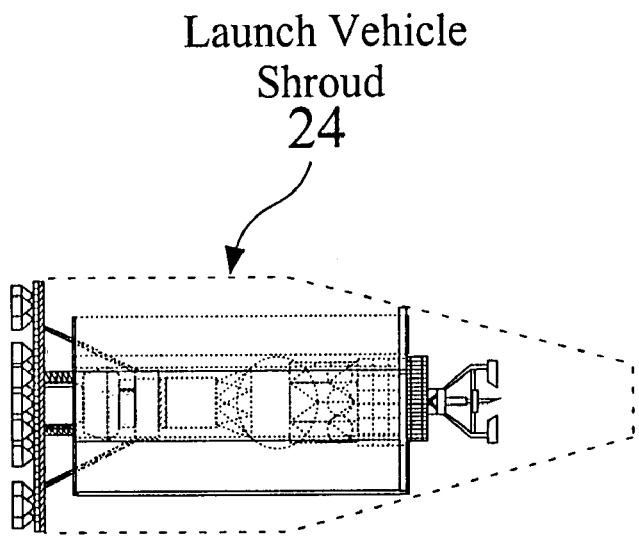
Figure 8:
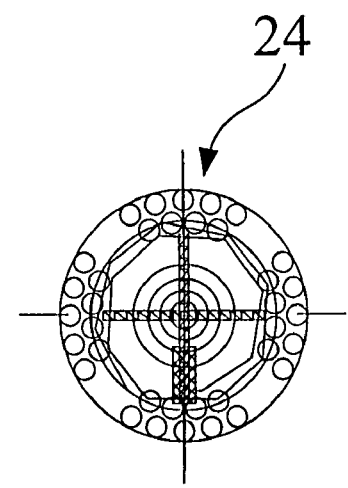
Figure 7:
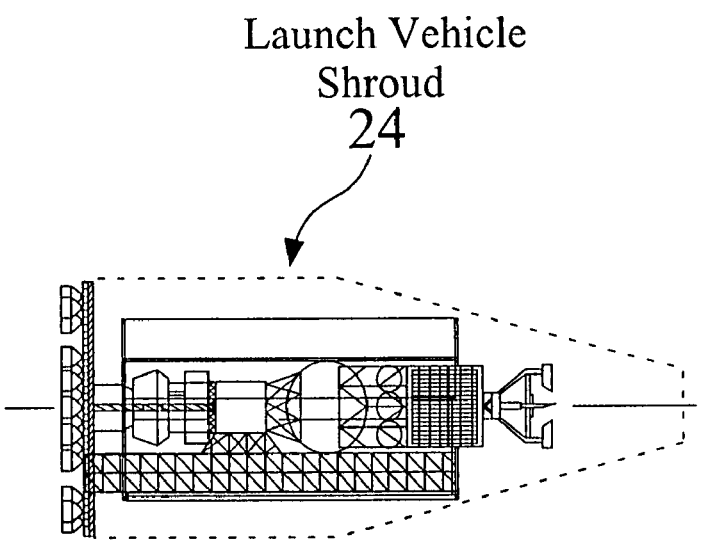

In a preferred embodiment of the invention, the tank 13 is refillable, and may be refilled in a relatively lower zero gravity environment. One embodiment of the invention includes one or more tanks that provides the propulsion system with propellant. In one embodiment of the invention, the tank may be refilled by a separate, automatic, unmanned spacecraft as shown in FIG. 2. When the IOSTAR™ vehicle runs low on propellant, it will be replenished by a servicing vehicle that either transfers all its propellant and is then released; or transfers its propellant gradually and is released when empty. In one embodiment, the IOSTAR™ will have a lower pressure tank so that pumping is kept to a minimum or eliminated. In another alternative, the size of the lower pressure tank is smaller, and includes limited life thrusters attached to the servicing vehicle. The electric thrusters on the service vehicle can be operated at higher power than the rest of the thrusters on the IOSTAR™ to enhance performance since the high power reduces lifetime, the thrusters are replaced with the next service vehicle. The thrusters may have a limited lifetime, and be used for a relatively small number of missions, or, may last for the entire lifetime of the IOSTAR™. The service vehicle may be equipped with application specific thrusters that are replaced with the next service vehicle.

Table Two contains a list of some of the propellants that may be employed to practice the present invention.

TABLE TWO

Propellants

Xenon
Mercury
Aluminum
Bismuth
Krypton
Helium
Argon
Production Kr—Xe mix
Hydrogen
Nitrogen
$N_2 + 2H_2$
$NH_3$
$H_2O$
$NH_3$
$CO_2$
$N_2H_4$
$CH_4$
Air
Lithium
Cesium
Indium
Teflon The recitation of propellant alternatives in Table Two is not intended to exclude any unlisted or equivalent alternatives.

The end of the boom 11 which holds the propellant tank 13 is equipped with reusable docking hardware 14 that is able to contact or grasp a satellite 15 or some other object in space. In one embodiment of the invention, the tank is replenishable. This docking hardware 14 maybe referred to as a grasping device, and may comprise any multiple-use means for engaging an object above the Earth. Many different embodiments of the docking hardware 14 may be incorporated in the present invention. In general, the preferred embodiment of the invention is reusable, utilizes a multiple-use docking device 14, which, unlike some of the prior art, is designed for many missions over a relatively long life-time.

The docking hardware 14 may be configured to interact with a wide variety of satellites 15 or other objects above the surface of the Earth. In general, the docking hardware 14 comprises any reusable or multiple-use means which is adapted to engage a payload launch vehicle interface, or to otherwise engage an object in space. Unlike some previous equipment designed for launch into orbit, the present invention includes a grasping means 14 which is not permanently affixed or connected to a payload.

A radiator 16 is disposed generally perpendicular to the boom 11 near the ion thrusters 12. The radiator 16, which conveys a coolant through manifold 17 and fluid flow tubes 18, dissipates heat from an energy converter out to space. The energy converter is powered by a nuclear reactor 19. The radiator 16 is generally situated between the grasping device 14 and the reactor 19. In general, the radiator 16 is a pumped fluid loop. An alternative embodiment comprises a capillary pump loop and/or heat pipes. In another alternative embodiment of the invention, the radiator 16 may be disposed along the boom 11, or a single combined radiator/boom means may be employed.

The reactor 19 generates heat through the controlled fission of nuclear fuel. This heat is then converted to electrical power. In a preferred embodiment, the reactor 19 is gas-cooled. In alternative embodiments, the reactor 19 employs a liquid-metal coolant, or some other working fluid or heat pipes. The reactor 19 is coupled to a radiation shield 20, which protects the object, payload or satellite 15 from radiation generated by the reactor 19. In one embodiment of the invention, the radiator 16 is configured to remain entirely within the protective zone of the radiation shield 20. In one embodiment, the radiation shield 20 incorporates multiple zone shielding to minimize mass. In another embodiment, the radiation shield includes a recuperator that is also employed as a gamma shield.

In a preferred embodiment of the invention, from 250 kW to 500 kW of sustained electrical power may be generated aboard an IOSTAR™, which vastly exceeds the sustained power generating capabilities of any prior man-made satellite or spacecraft. This power generation capacity is huge when compared to the power levels of conventional satellites and spacecraft, which typically operate with less than 20 kW of power. This immense on-orbit power generating capacity enables the IOSTAR™ to conduct missions which are not feasible using conventional satellites. These missions include, but are not limited to, satellite inspection, monitoring, rescue, retrieval, repair, servicing, refueling and repositioning; direct communication services; in-orbit power generation for other spacecraft like the International Space Station; and interplanetary tasks, operations or transfers that may occur well beyond Earth orbit, such as trips to the Moon, the Asteroids, or the Planets.

The reactor 19 is also coupled to an energy converter 22 which converts heat to electrical energy. In one embodiment, the energy converter 22 includes a turbine driven by fluid that is heated by the reactor 19 to produce a large amount of electrical power. The converter 22 is coupled to the boom 11, next to the radiation shield 20. An energy converter may be an direct converter, which converts heat directly to electricity. As an alternative, an energy converter may be an indirect converter, which converts thermal energy to mechanical energy, and then to electrical energy. In a preferred embodiment of the invention, the converter employs the Brayton Cycle. In alternative embodiments, the converter may be a Rankine or Stirling Cycle converter. A thermoelectric or thermionic converter may also be employed. In a preferred embodiment of the invention, a recuperator may be connected to the energy converter.

II. Details of IOSTAR™ Embodiments

FIG. 3 provides a side view, where the IOSTAR™ is viewed along its side in the plane of the radiator panels 16. FIG. 4 offers a view of the invention in its fully collapsed configuration, capable of being stowed in a launch vehicle shroud 24.

FIGS. 5, 6, 7 and 8 present more detailed end and cross-sectional views of the IOSTAR™ stowed in the launch vehicle shroud 24. In one preferred embodiment of the invention, the IOSTAR™ is placed in orbit using the United States Space Shuttle.

FIG. 9 supplies a schematic block diagram of control systems 28 designed for a preferred embodiment of the invention. A doubly redundant set of CPUs manage the many subsystems aboard the IOSTAR™, including antennas 30, docking and star cameras 32, 34, RADAR and LIDAR systems 36 for tracking objects or satellites 15, an ion thruster controller 38, and power and thrust system controls 40. These systems enable the present invention to rendezvous and dock with a satellite or object in orbit. In an alternative embodiment, the various sensors and cameras aboard the IOSTAR™ may be used to conduct remote sensing missions. The block diagram also relates the CPUs to attitude sensors and controls 42, the 28 VDC power system 44, the bus health and attitude control subsystems 46, 48 and an emergency blowdown thruster control 50.

FIG. 10 offers a detailed schematic view of the ion propulsion system 12. A mixture of helium and xenon flows from tank 13 to the ion engine 12, where ions are created by a hollow cathode and accelerated through a series of grids to provide thrust for the IOSTAR™ spacecraft.

FIG. 11 reveals a cross-sectional view of one embodiment of the invention, depicting the launch vehicle shroud 24, radiators 16, manifolds 17 and energy converter 22.

FIG. 12 supplies a schematic diagram which offers an overview of the Brayton System, the energy converter 22 that is utilized in a preferred embodiment of the invention. Heat from the reactor 19 drives a turbine, which, in turn, drives an alternator and a compressor. A recuperator increases the efficiency of the system by recovering a portion of the heat from the turbine exhaust to pre-heat the working fluid. Radiators 16 expel waste heat to outer space.

FIG. 13 provides a view of an alternative embodiment of the IOSTAR™ which includes radiators disposed along the boom.

III. IOSTAR™ Missions & Operations

The present invention is different from conventional orbital systems, in that it will be capable of accomplishing many missions over a long life. Although the IOSTAR™ will be reusable, in one embodiment the entire system will be capable of being launched using a single launch vehicle, preferably the United States Space Shuttle. Other launch vehicles that are reusable or expendable may also be employed. The first implementation of the IOSTAR™ will be constructed primarily or entirely on the Earth's surface, and then will be launched into orbit. Later implementations may be partially or completely constructed in orbit. In general, the IOSTAR™ may be controlled from a terrestrial operations center, or may operated by an on-orbit controller.

In general, the invention is fully extended after launch, and is then ready for operations. A first, general mission will comprise locating a satellite already in orbit, and then grasping, moving and releasing that satellite. IOSTAR™ will be able to move spacecraft between low Earth orbits and positions in higher orbits or to other locations in our Solar System. This primary mission of moving an object in space includes transporting satellites from one position in an orbit to another, from one orbit to another, to distant locations beyond Earth orbit or from distant locations beyond Earth orbit back to Earth orbit. The IOSTAR™ may be used for missions to the Moon, to the Planets or to the asteroids. Another mission may include changing the position of a satellite so that it is purposefully de-orbited.

In general, the term "rendezvous" pertains to the approach of an IOSTAR™ to another object or objects in space. Rendezvous may or may include station-keeping, or any contact, probing, interaction, coupling, observing or docking between an IOSTAR™ and another object.

Once the IOSTAR™ completes its rendezvous and docking with a satellite, the satellite may be transported for retrieval and/or repair. In general, the repositioning of a satellite from one location to another will involve moving the satellite along an incremental, expanding, generally spiral pathway. FIG. 14 illustrates one of the basic methods of the invention. A satellite 15 is first launched using a conventional booster to a low Earth orbit of roughly 150 nautical miles. The IOSTAR™ 10 then completes a rendezvous with the satellite 15, and engages the satellite 15 with its docking hardware 14. The IOSTAR™ then gradually raises the altitude of the satellite 15 to an operational orbit by moving the payload along an incremental, expanding spiral pathway. This procedure provides substantial cost savings for delivering a spacecraft to an operational orbit compared to the conventional technique of launching spacecraft with a multi-stage rocket. In an alternative embodiment of the invention, the IOSTAR™ will be able to rendezvous with an object beyond Earth orbit. In this embodiment, the IOSTAR™ will be capable of retrieving an object or spacecraft from a remote location beyond Earth orbit.

FIG. 15 depicts an orbital repositioning mission. The invention may not only be used to transport a new satellite to its destination orbit, but may also be employed to capture a satellite which has reached the end of its useful life and needs to be safely de-orbited or placed in a disposal orbit.

In general, the primary IOSTAR™ mission will involve rendezvousing and docking with a spacecraft which is already in a low Earth orbit. After docking, the IOSTAR™ will then move from a low Earth orbit to a high Earth orbit or to a position beyond Earth orbit. As an alternative, the IOSTAR™ will first travel to a high orbit or to a position beyond Earth orbit, locate and grasp an object, and then relocate it to Earth orbit or to a different position beyond Earth orbit.

FIGS. 16 & 17 compare a conventional geosynchronous mission to an IOSTAR™ mission. In a conventional launch, a satellite reaches high orbit in seven to ten hours, but at great expense. Using IOSTAR™, the satellite takes a gradual spiral path over a 45 to 65 day period to reach high orbit, but at a much lower cost.

FIGS. 18, 19, 20 and 21 furnish generalized views of four representative IOSTAR™ missions, including in-orbit placement, in-orbit repair, recovery and retrieval and Space Station Servicing. While all the IOSTAR™ objectives and missions are too numerous to delineate in this Specification, Table Three provides a representative and illustrative list of uses for the present invention in outline form.

TABLE THREE

Objectives & Missions

Correct an anomalous satellite Earth orbit
Provide mobility for a satellite in orbit
Move a satellite in space from one geostationary orbital position to another
Move a satellite in space from one geosynchronous orbital position to another
Inspect a satellite in orbit
Repair a satellite in orbit
Extend useful life of a satellite
    By replenishing a consumable
    By replenishing power
    By replenishing fuel
    By replacing a battery
    By replacing a satellite component
Reposition a satellite to a lower orbit
Reposition a satellite to a higher orbit
Service a spacecraft in combination with the U.S. Space Shuttle
Service a spacecraft in combination with the International Space Station
Reposition a spacecraft from a low to a high orbit to realize cost savings compared to the costs of a conventional launch
Move a satellite into a disposal orbit
Provide services to an insurer
Salvage a spacecraft in accordance with an insurance contract
Enable an insurer to lower launch premiums
Obtain information about a failure of an orbiting asset or spacecraft
Enable an insurer to lower the financial risks of a spacecraft launch
Maintain a fleet of operating spacecraft, including United States Global Positioning Satellites
Supply on-orbit power to another spacecraft
Move spare spacecraft from one orbital altitude or plane to another
Provide services to a spacecraft manufacturer
Provide services to a spacecraft user
Provide services to a government agency TABLE THREE-continued Objectives & Missions Use IOSTAR ™ as a reusable upper stage of a conventional launch vehicle to reduce launch costs
Use IOSTAR ™ and a laser used for orbital debris removal
Use laser to divert an asteroid
Produce propellant from an asteroid
Produce propellant from water launched into orbit from Earth
Produce propellant from a stable, storable material launched into orbit from Earth
Process ice present on an asteroid by electrolysis to form hydrogen and oxygen
Process carbonaceous material present on an asteroid to form a storable propellant
Recycle satellites in space FIGS. 22 and 23 portray the IOSTAR™ in combination with the International Space Station. One embodiment of the invention will be configured to provide direct communication services that include any one or two-way transmissions or emanations between or among the IOSTAR™ and terminals on or near the Earth's surface, or with other satellites or spacecraft. One example of a conventional direct communication service is a high-bandwidth transmission to consumers like DirecTV™. In general, these direct communication services will be conducted using electromagnetic, optical or any other suitable frequencies or modes of communication over a distance. In one embodiment of the invention, IOSTAR's direct communication services will be conducted using frequency bands 11 and 12. Frequency band 11 extends from 30 to 300 GigaHertz, and is also referred to by the term "millimetric waves." Frequency band 12 extends from 300 to 3000 GigaHertz or 3 TeraHertz, and is also referred to by the term decimillimetric waves. This nomenclature of frequency bands was adopted in the Radio Regulations of the International Telecommunication Union, Article 2, Section 11, Geneva; 1959.

These direct communication services will generally be enabled by IOSTAR's enormous power generating capabilities. FIG. 24 is a perspective view of a satellite having an array of antennas which may be used in combination with an IOSTAR™ to provide a direct broadcast system 52. Since the IOSTAR™ can generate very high levels of electrical power compared to conventional satellites 15, it may be used to transmit direct broadcast signals at extremely high frequencies. The Ka-Band (20-30 GHz) is the highest range of radio frequencies that are currently used by commercial satellites to communicate with customers on the ground. By drawing on its massive power supply, the IOSTAR™ Direct Broadcast System will be capable of offering regulated direct broadcast signals at frequencies of 100 GHz and beyond using high power amplifiers, such as a traveling wave tube amplifiers or grid amplifiers. This direct broadcast system may also employ and a beam-forming array or a steerable antenna to penetrate layers of the atmosphere which absorb and scatter conventional, lower power signals. In general, the present invention is capable of generating a vast amount of electrical power to provide a wide variety of direct communication services that offer direct transmissions between the present invention and terrestrial terminals. In one embodiment of the invention, direct communication services are conducted using frequency bands 11 and 12. In general, these direct communication services may be provided by the present invention utilizing any means, mechanism or phenomenon that exploits particle or electromagnetic wave transmissions, forces, fields or action at a distance, including the radio-frequency and optical spectra.

Scope of the Claims

Although the present invention has been described in detail with reference to a particular, preferred embodiment and alternate embodiments, persons possessing ordinary skill in the art to which this invention pertains will appreciate that various modifications and enhancements may be made without departing from the spirit and scope of the Claims that follow. The various embodiments, implementations and applications that have been disclosed above are intended to educate the reader about particular embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10 In-Orbit Space Transportation & Rescue System, or IOSTAR™
11 Collapsible spacecraft boom
12 Electric propulsion system
13 Propellant tank
14 Grasping/Docking mechanism
15 Satellite or other payload or cargo
16 Radiator
17 Manifold bellows
18 Gas flow tubes
19 Nuclear reactor
20 Radiation shield
22 Energy converter
24 Launch vehicle
28 Block diagram of control systems
30 Antenna
32 Docking cameras
34 Star cameras
36 RADAR & LIDAR
38 Ion thruster controller
40 Power and thrust system controllers
42 Attitude sensors and controls
44 28 VDC charger and regulator
46 Bus health and status multiplexer and D/A converters
48 Attitude control thruster on/off control
50 Emergency blowdown thruster control
52 IOSTAR™ Direct Broadcast System

What is claimed is:

1. An apparatus comprising:
    a) a boom means (11) for providing support;
    b) a nuclear reactor means (19) for generating heat; said nuclear reactor means (19) being coupled to said boom means (11);
    c) a payload protection means (20) protecting a payload (15) from radiation, wherein the payload (15) comprises an attached, fully deployed satellite and the payload protection means comprises a radiation shield incorporating multiple zone shielding that minimizes mass and protects extended appendages on the fully deployed satellite, said payload protection means (20) being coupled to said nuclear reactor means (19);
    d) a radiator means (16) for dissipating heat; said radiator means (16) being coupled to said nuclear reactor means (19);
    e) an electric propulsion means (12) for supplying thrust; said electric propulsion means (12) being coupled to said nuclear reactor means (19);
    f) a propellant tank means (13) for storing fuel for said electric propulsion means (12); said propellant tank means (13) being coupled to said boom means (11); and
    g) a multiple-use grasping means (14) for engaging a satellite above the surface of the Earth; said grasping means (14) being coupled to said boom means (11), generally at one end of said boom means (11).

2. An apparatus as recited in claim 1, including an on-board camera for performing a satellite rendezvous.

3. An apparatus as recited in claim 1, including an on-board camera for performing a satellite docking maneuver.

4. An apparatus as recited in claim 1, wherein the payload protecting means (20) further comprises a recuperator that is also employed as a gamma shield.

5. An apparatus as recited in claim 1, wherein the nuclear reactor means and an energy converter coupled to the nuclear reactor are capable of producing at least 250 kW of sustained electrical power.

6. A spacecraft comprising:
    a) a boom;
    b) a nuclear reactor coupled to said boom;
    c) a radiation shield coupled to said nuclear reactor and incorporating multiple zone shielding protecting an attached satellite;
    d) a radiator coupled to said nuclear reactor;
    e) an electric propulsion device coupled to said nuclear reactor;
    f) a propellant tank storing fuel for said electric propulsion device coupled to said boom; and
    g) a multiple-use grasping device engaging said satellite above the surface of the Earth coupled to said boom generally at one end of said boom.

7. The spacecraft of claim 6 further comprising an on-board camera for performing a satellite rendezvous.

8. The spacecraft of claim 6 further comprising an on-board camera for performing a satellite docking maneuver.

9. The spacecraft of claim 6 wherein the radiation shield further comprises a recuperator that is also employed as a gamma shield.

10. The spacecraft of claim 6 wherein the nuclear reactor and an energy converter coupled to the nuclear reactor are capable of producing at least 250 kW of sustained electrical power.

* * * * *